US009215693B2

(12) United States Patent
Ahn et al.

(10) Patent No.: US 9,215,693 B2
(45) Date of Patent: Dec. 15, 2015

(54) METHOD FOR RADIO RESOURCE MANAGEMENT IN DEVICE-TO-DEVICE COMMUNICATION

(71) Applicant: Electronics and Telecommunications Research Institute, Daejeon (KR)

(72) Inventors: Jae Young Ahn, Daejeon (KR); Choong Il Yeh, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/667,576

(22) Filed: Nov. 2, 2012

(65) Prior Publication Data

US 2013/0114531 A1 May 9, 2013

(30) Foreign Application Priority Data

Nov. 2, 2011 (KR) ........................ 10-2011-0113605

(51) Int. Cl.
*H04W 72/04* (2009.01)
*H04W 8/26* (2009.01)
*H04W 76/02* (2009.01)

(52) U.S. Cl.
CPC ................ *H04W 72/04* (2013.01); *H04W 8/26* (2013.01); *H04W 76/023* (2013.01)

(58) Field of Classification Search
CPC .................................................... H04W 72/04
USPC ................................................. 370/329, 330
See application file for complete search history.

(56) References Cited

U.S. PATENT DOCUMENTS

| | | | |
|---|---|---|---|
| 7,986,698 B2 | 7/2011 | Li et al. | |
| 2008/0298318 A1* | 12/2008 | Lee et al. | 370/329 |
| 2009/0016261 A1 | 1/2009 | Laroia et al. | |
| 2009/0232143 A1 | 9/2009 | Li et al. | |
| 2013/0039333 A1* | 2/2013 | Li et al. | 370/330 |
| 2014/0057670 A1* | 2/2014 | Lim et al. | 455/509 |
| 2014/0086180 A1* | 3/2014 | Lee et al. | 370/329 |

FOREIGN PATENT DOCUMENTS

| | | |
|---|---|---|
| KR | 1020100038228 | 4/2010 |
| KR | 1020100134034 | 12/2010 |
| KR | 1020100136501 | 12/2010 |

* cited by examiner

*Primary Examiner* — Albert T Chou
(74) *Attorney, Agent, or Firm* — Nelson Mullins Riley & Scarborough LLP

(57) ABSTRACT

Provided is a radio resource management method for device-to-device communication. The resource management method for device-to-device communication includes dividing a plurality of connection identifiers (CIDs) into N (N is a natural number) number of groups, dividing the resources for device-to-device communication into N number of sub-bands corresponding to the N number of groups, and allocating resources by mapping CIDs respectively belonging to the N number of groups to resources of sub-bands respectively corresponding to the groups. Therefore, according to the resource management method, by dividing the whole frequency band into a plurality of sub-bands, a communication range may be extended, a low-power device may be accommodated, granularity of resources may be improved, and flexibility of resource management may be obtained.

9 Claims, 7 Drawing Sheets

METHOD FOR RADIO RESOURCE MANAGEMENT IN DEVICE-TO-DEVICE COMMUNICATION

CLAIM FOR PRIORITY

This application claims priority to Korean Patent Application No. 10-2011-0113605 filed on Nov. 2, 2011 in the Korean Intellectual Property Office (KIPO), the entire contents of which are hereby incorporated by reference.

BACKGROUND

1. Technical Field

Example embodiments of the present invention relate in general to a device-to-device communication method, and more particularly, to a method for improving flexibility of radio resource management for device-to-device communication.

2. Related Art

Device-to-device communication (hereinafter, also referred to as D2D communication) means a communication scheme in which data communication between adjacent two terminals is directly performed without intervention of a base station. That is, the two terminals become a source and a destination to communicate with each other.

Regarding a use case in which device-to-device communication may be efficiently used, various discussions have been carried on. As an example, device-to-device communication may be used for a local media server that provides mass data (e.g. rock concert program and musician information) to visitors to a rock concert.

Here, each device may access a serving cell to perform a telephone call or internet access by using a conventional cellular link, and may also directly transmit/receive the mass data to/from the local media server acting as a counterpart of D2D communication.

A D2D link is not only enabled among devices having the same cell as a serving cell, but also enabled among devices having different cells as serving cells. For instance, device 3 belonging to a first base station may communicate with device 6 belonging to a second base station.

Device-to-device communication may be classified into centralized D2D communication and distributed D2D communication.

According to centralized D2D communication, a device desiring communication with another device asks a central node (base station in a cellular node) that performs control to set up a link, and the central node allocates, when the counterpart device is located near the device, radio resources so that the devices communicate with each other. Here, almost all operations of the devices are managed by the central node, and radio resources allocated for the cellular link or another D2D link may be reused for D2D communication.

According to distributed D2D communication, a link is set up in a distributed control manner through direct signal exchange between devices without depending on a single central control node, and, by using this link, data is directly exchanged with an adjacent device. FlashLinQ technology proposed by Qualcomm Incorporated is a representative distributed D2D communication technology. FlashLinQ technology corresponds to synchronous technology based on time division duplexing (TDD).

According to current distributed D2D communication technology such as FlashLinQ technology, each D2D link is scheduled in the whole frequency band to perform data transmission between devices. Therefore, a communication range is reduced, and it is difficult to accommodate a low-power device. Further, in order to increase granularity of resources, signaling overhead for connection scheduling or rate scheduling is increased.

SUMMARY

Accordingly, regarding device-to-device communication, example embodiments of the present invention are provided to reduce possibility of resource collision by flexibly managing resources, and guarantee preferential access for a device or application having a high priority.

In some example embodiments, a method for managing resources for device-to-device communication includes dividing a plurality of connection identifiers (CIDs) into N (N is a natural number) number of groups, dividing the resources for device-to-device communication into N number of sub-bands corresponding to the N number of groups, and allocating the resources by mapping CIDs respectively belonging to the N number of groups to the resources of the sub-bands respectively corresponding to the groups.

Here, during the dividing of the resources, the N number of sub-bands may have the same resource size. Or, during the dividing of the resources, sizes of resources of at least a part of the N number of sub-bands may be different from sizes of resources of the other sub-bands.

Here, during the allocating of the resources, the allocated resources may be for request to send (RTS) and clear to send (CTS).

Here, during the allocating of the resources, the allocated resources may be for at least one of pilot signal transmission, channel quality information (CQI) transmission, data transmission/reception, and ACK signal transmission.

Here, during the dividing of the CIDs and the dividing of the resources, configuration information on the N number of groups and the N number of sub-bands may be received from a network by using at least one of system information (SI) reception and radio resource control (RRC) signaling In other example embodiments, a method for managing resources for device-to-device communication includes dividing a plurality of connection identifiers (CIDs) into N (N is a natural number) number of groups, assigning a dedicated resource for preferential access to at least one of the N number of groups, and allocating the dedicated resource for preferential access to CIDs belonging to the one group.

Here, during the assigning of the dedicated resource for preferential access, the resources for device-to-device communication may be divided, for each of the N number of groups, into N number of sub-bands to which RTS/CTS resources are allocated, and, during the allocating of the dedicated resource for preferential access, the dedicated resource for preferential access may be allocated in a sub-band corresponding to the at least one group. Here, during the assigning of the dedicated resource for preferential access, the N number of sub-bands may have the same resource size. Or, during the assigning of the dedicated resource for preferential access, sizes of resources of at least a part of the N number of sub-bands may be different from sizes of resources of the other sub-bands.

Here, during the allocating of the dedicated resource for preferential access, the allocated resource may be for request to send (RTS) and clear to send (CTS).

Here, during allocating of the dedicated resource for preferential access, the allocated resource may be for at least one of pilot signal transmission, channel quality information (CQI) transmission, data transmission/reception, and ACK signal transmission.

Here, during the dividing of the CIDs and the assigning of the dedicated resource for preferential access, configuration information on the N number of groups and the dedicated resource for preferential access may be received from a network by using at least one of system information (SI) reception and radio resource control (RRC) signaling.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

The present invention may be variously modified and may include various embodiments. However, particular embodiments are exemplarily illustrated in the drawings and will be described in detail.

However, it should be understood that the particular embodiments are not intended to limit the present disclosure to specific forms, but rather the present disclosure is meant to cover all modification, similarities, and alternatives which are included in the spirit and scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A terminal used in the specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the other terms. Various embodiments of the terminal may include a cellular phone, a smart phone having a wireless communication function, a personal digital assistant (PDA) having a wireless communication function, a wireless modem, a portable computer having a wireless communication function, a capturing device such as a digital camera having wireless communication function, a game device having a wireless communication function, a music storage and replay appliance having a wireless communication function, an Internet appliance enabling wireless Internet access and browsing, and terminals or a portable unit having combinations of the functions, but the present invention is not limited thereto.

A base station used in the specification is a part that is generally fixed or moved to communicate with terminals, and may be a term that indicates the collective name for a base station, a node-B, an eNode-B, a base transceiver system, an access point, a relay, a femto cell, etc.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 1:
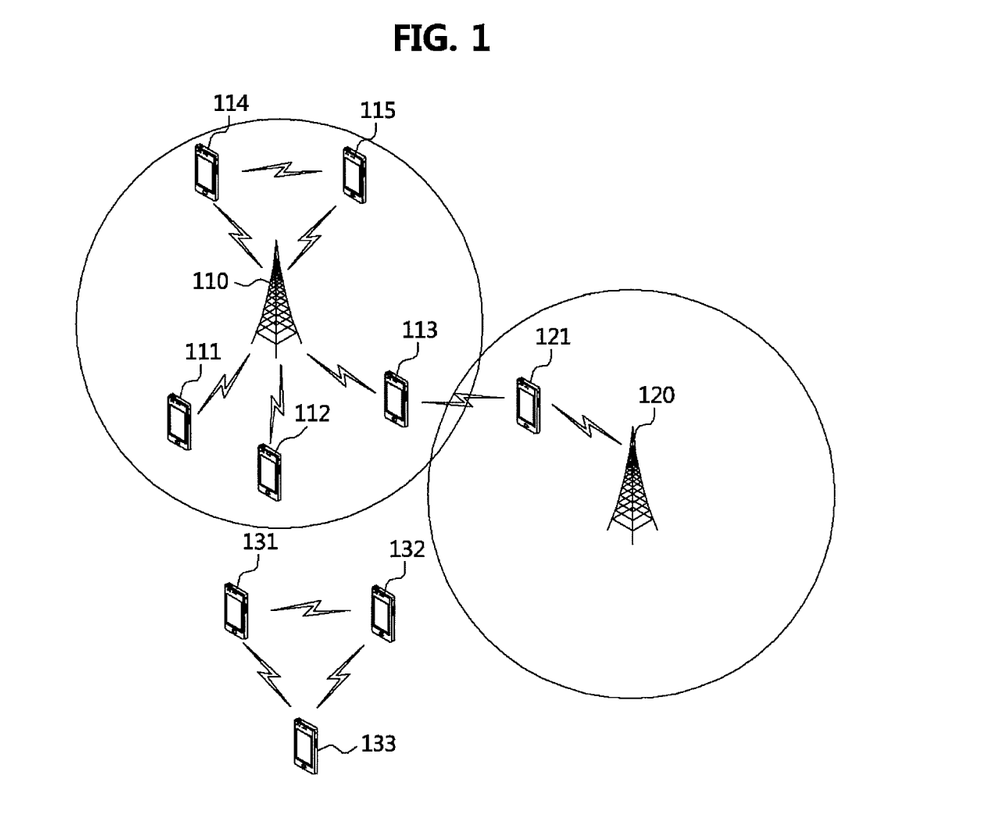
FIG. 1 is a conceptual diagram illustrating a concept of device-to-device communication.

FIG. 1 is a conceptual diagram illustrating a concept of device-to-device communication.

FIG. 1 is a conceptual diagram for comparing conventional cellular communication with device-to-device communication. Referring to FIG. 1, a cellular communication network including a first base station 110 and a second base station 120 is illustrated.

Here, first to third terminals 111 to 113 belonging to a cell generated by the first base station perform communication through a typical access link (cellular link) that passes through the first base station. However, fourth and fifth terminals 114 and 115 belonging to the first base station directly transmit/receive data to/from each other without passing via the base station. Here, the fourth and fifth terminals may communicate directly with each other under control of the base station, or may also communicate directly with each other without control of the base station. The third terminal 113 may also communicate directly with a sixth terminal 121 located in an adjacent cell.

Further, independent of this cellular network, terminals not belonging to a base station may communicate directly with each other.

For instance, there is no base station for seventh to ninth terminals 131 to 133, and each of the terminals is configured to intercommunicate directly.

A device-to-device communication method according to the present invention relates to improvement of a discovery procedure of synchronous distributed control D2D communication technology.

Figure 2:
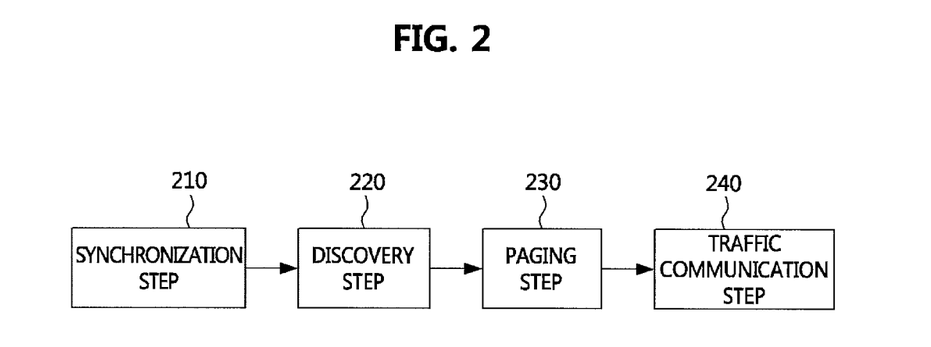
FIG. 2 is a conceptual diagram illustrating operation procedures of distributed control D2D communication.

FIG. 2 is a conceptual diagram illustrating operation procedures of distributed control D2D communication.

Referring to FIG. 2, distributed control D2D communication may include synchronization step 210, discovery step 220, paging step 230, and traffic communication step 240.

FlashLinQ technology proposed by Qualcomm Incorporated is a representative example of distributed control D2D communication technology. FlashLinQ technology also configures communication procedures including the above-mentioned procedures. However, the operation procedures of distributed control D2D communication, described below, may be typical operation procedures of synchronous distributed control D2D communication, and may not be necessarily limited to FlashLinQ technology.

In the synchronization step, each device participating in D2D communication obtains synchronization by using an appropriate reference signal so as to derive timings for time slots where discovery, paging, and traffic communication are performed.

Figure 3:
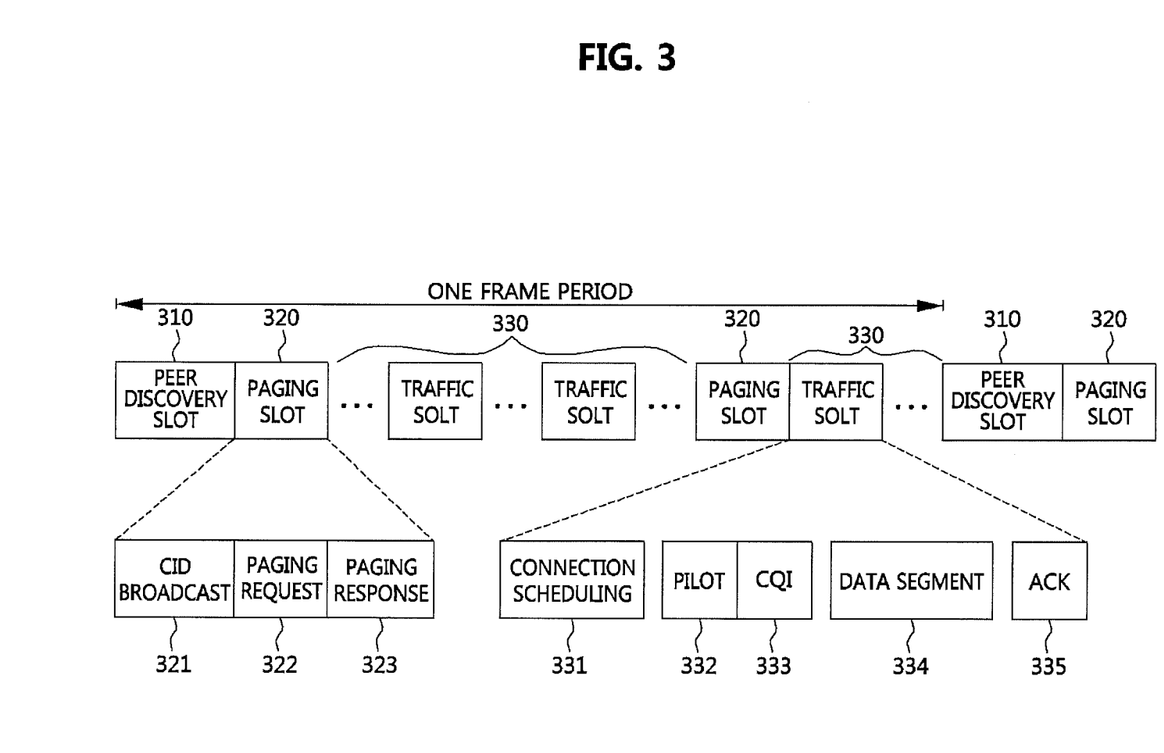
FIG. 3 is a timing diagram illustrating a synchronous timing structure of the operation procedures of distributed control D2D communication.

FIG. 3 is a timing diagram illustrating a synchronous timing structure of the operation procedures of distributed control D2D communication.

Referring to FIG. 3, a device that has obtained synchronization is allowed to perform only discovery-related operations in a peer discovery slot 310, only paging-related operations in a paging slot 320, and only operations for traffic data exchange in traffic slots 330. This is a necessary characteristic procedure of synchronous distributed control D2D communication, and is basically for minimizing power consumed for the discovery and paging by devices participating in D2D communication.

The discovery step is for discovering another device capable of D2D communication. That is, each device transmits information ("expression", generated by using, e.g., a device ID and an application ID) needed for notifying existence of each device by using a peer discovery resource (PDR) not used by another device, and receives information transmitted from other devices so as to detect adjacent peers.

The paging step is for setting up a connection between a device that needs to perform transmitting/receiving and an adjacent device, after the discovery step. That is, the paging step is for securing an additional ID for participating in a connection setup process of the traffic step, i.e. a connection ID (CID). Here, the CID may be a temporal and local value.

In the traffic step, data transmitting/receiving is performed. That is, all of devices that have secured the CID in the paging step participate in performing distributed scheduling, and devices that have secured transmitting/receiving rights by performing the distributed scheduling, transmit and receive data.

Figure 4:
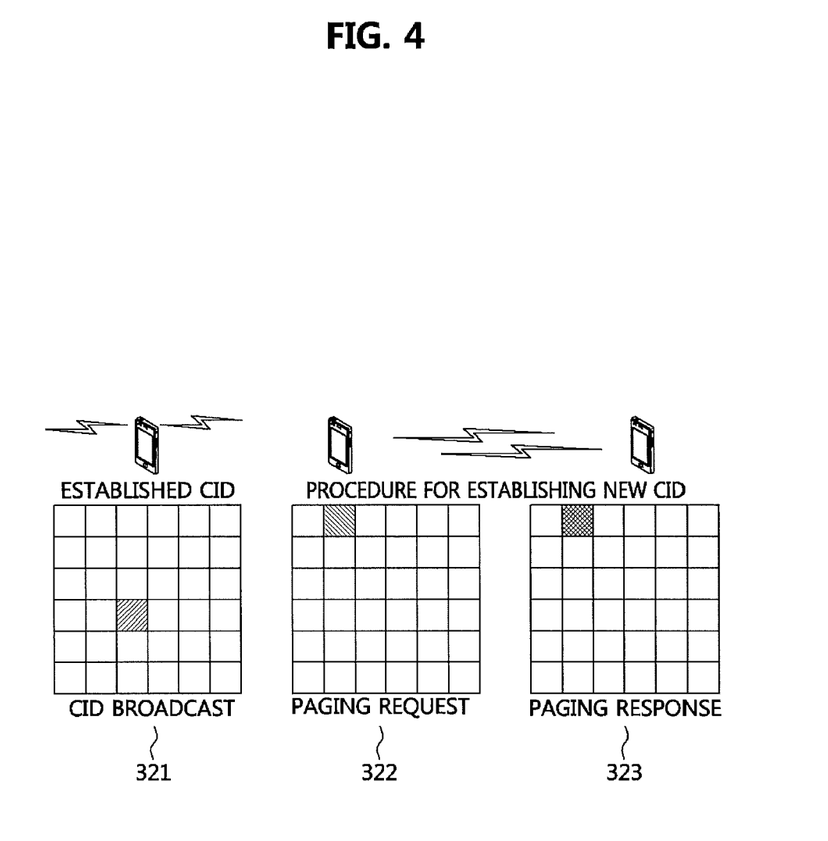
FIG. 4 is a conceptual diagram illustrating a paging step of distributed control D2D communication.

FIG. 4 is a conceptual diagram illustrating the paging step of distributed control D2D communication.

Referring to FIG. 4, the paging step may be divided into CID broadcast step 321, paging request step 322, and paging response step 323. A device that has requested paging through the paging step, i.e. a pager, and a device responding to paging, i.e. a pagee, secure the same CID.

In the CID broadcast step, devices, which have previously secured the CID and desire to participate in continuous link scheduling in a following traffic step, broadcast the CID by using resources confronting the CID. During this slot, devices other than the devices broadcasting the CID perform receiving operations.

In the paging request step, each pager desiring to perform traffic communication generates a CID (by using a hash function) by using the expression of each pager and the expression of each pagee, and, when the generated CID does not match the CIDs received during the CID broadcast slot, the pager transmits a paging request signal by using a radio resource corresponding to this CID. All devices other than the device that has transmitted the paging request signal performs, during this slot, an operation for checking whether each CID is received.

In the paging response step, all devices other than the pager generate CIDs by using private expressions possessed by the devices and the expressions of counterpart devices, and also generate a CID by using a public expression. Here, the public expression and a purpose thereof may be predefined in order to be shared by all devices participating in discovery.

That is, a pagee generates the same CID by using the same expression information as that of a pager, and checks whether the CIDs received during the paging request slot match the CIDs generated by the pagee. When there is a matching CID and this CID does not match the CIDs received during the CID broadcast slot, the corresponding device, i.e. the pager, transmits a paging response by using a resource corresponding to the CID.

This is for avoiding a situation in which a pair of different devices generates the same CID and then undergoes the traffic step since the CIDs received by the pager and the pagee during the CID broadcast slot may be different.

In the traffic step, data transmitting/receiving is performed. That is, all of devices that have secured the CID in the paging step participate in performing distributed scheduling, and devices that have secured transmitting/receiving rights by performing the distributed scheduling, transmit and receive data.

A slot in which the traffic step is performed is divided into a link scheduling slot 331, a pilot slot 332, a CQI slot 333, a data slot 334, and an ACK slot 335.

The link scheduling (or connection scheduling) slot is for allowing devices to spatially reuse radio resources at maximum efficiency without interfering with each other through signal exchange, and for scheduling transmitting/receiving rights for the data slot in a distributed manner without control of a central node. That is, devices having data to be sent repeatedly participate in link scheduling during the traffic slot, and the link scheduling slot includes a request to send (RTS) slot and a clear to send (CTS) slot.

Each CID is mapped to a pair of radio resources of the RTS and CTS. Priority of the radio resources of the RTS and CTS for scheduling is determined according to locations of the resources. Selection of one pair of radio resources is pseudo-randomized on the basis of the CID, and the selection is newly performed for each traffic slot for fairness.

A device having data to be sent transmits a signal by using a radio resource corresponding to the CID secured by the device in the RTS slot. A device that has received the transmitted signal transmits a CTS signal by using a radio resource corresponding to the same CID in the CTS slot when a signal to interference ratio (SIR) of the received signal is higher than a certain level, but gives up transmitting the CTS signal when the SIR is lower than the certain level.

A device that has transmitted the RTS gives up transmitting traffic data and does not participate in procedures of the pilot slot to the ACK slot when the CTS signal is not received at a resource corresponding to the same CID (a reception level is lower than a certain level), or when it is determined that links having higher priority (determined by CID) will experience a certain level of interference or higher.

The pilot slot and the CQI slot may be together referred to as a rate scheduling slot. A transmitting device that has secured a radio resource in a distributed manner through the connection scheduling process transmits a pilot signal, and a receiving device measures a channel by using this signal and generates appropriate CQI information to respond to the transmitting device.

In the data slot and ACK slot, the transmitting device transmits data according to the CQI information, and the receiving device responds with ACK.

A device-to-device communication method according to the present invention relates to a radio resource management method of synchronous distributed control D2D communication technology.

According to conventional distributed D2D communication technology, data is transmitted between devices by using the whole frequency band. Therefore, a communication range is reduced, and it is difficult to accommodate a low-power device. Further, in order to increase granularity of resources, signaling overhead of connection scheduling or rate scheduling is increased.

Therefore, the present invention is provided to overcome the problem of inefficient resource management due to D2D link scheduling at the whole frequency band of conventional distributed D2D communication technology.

Firstly, an efficient resource management method according to the present invention will be described. According to the efficient resource management method, the whole frequency band is divided into a plurality of frequency bands in the traffic step so that resources are managed within the frequency bands. By restrictively allowing contention by dividing a frequency band into a plurality of frequency bands, a communication range may be extended, a low-power device may be accommodated, granularity of resources may be improved, and flexibility of resource management may be obtained.

Resource Management Method through Band Division according to the Present Invention According to the resource management method according to the present invention, the whole band is divided into a plurality of sub-bands.

Figure 5:
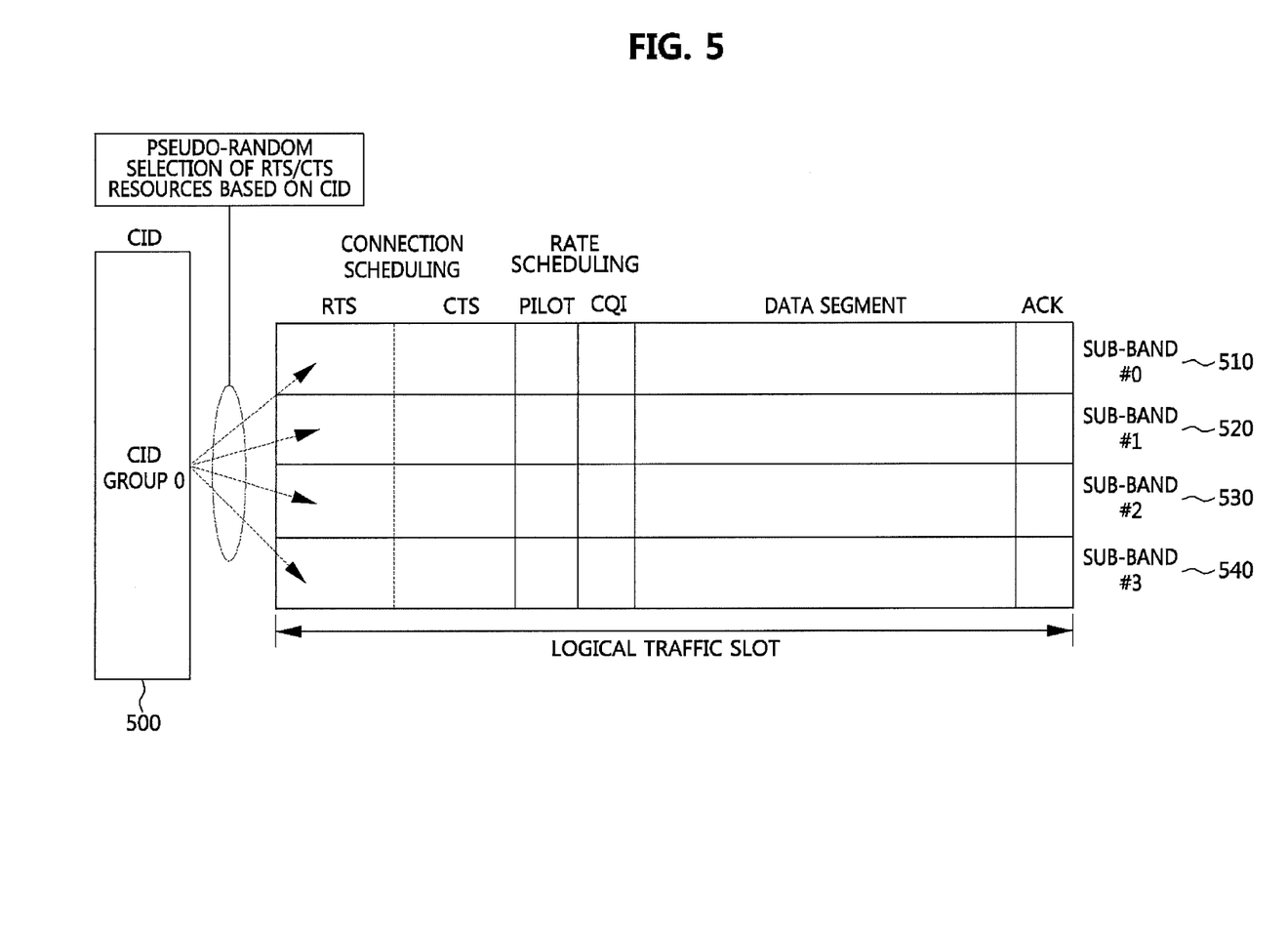
FIG. 5 is a conceptual diagram illustrating management of sub-bands according to the present invention.

FIG. 5 is a conceptual diagram illustrating management of sub-bands according to the present invention.

FIG. 5 illustrates procedures of determining a pair of RTS/CTS resources in a pseudo random manner on the basis of the CID determined in the paging step. That is, according to the CID secured in the paging step, radio resources to be used for the RTS/CTS step are pseudo-randomly selected, and each CID is mapped to RTS/CTS resources of a specific sub-band.

For instance, when a 0th CID group 600 includes N number of CIDs and four sub-bands 510 to 540 corresponding thereto exist, for N number of CIDs from 0th to N-1th CIDs, resources of sub-band #1 510 may be mapped to the 0th to (N/4)-1th CIDs, and resources of sub-band #2 520 may be mapped to the N/4th to 2×(N/4)-1th CIDs.

This band division is applied over the whole traffic slots from the connection scheduling process to the ACK process. In consideration of a yielding process performed in the RTS/CTS step, frequency resources where the RTS/CTS are transmitted are configured the same as frequency resources where actual traffic data is transmitted.

The transmission of RTS/CTS is performed on a per-sub-band basis. This means that scheduling contention is made only among CIDs for which RTS/CTS resources within a corresponding sub-band are selected.

A pair of devices which has obtained data transmission rights through contention may be configured to transmit/receive a pilot, CQI, data, and ACK within the same sub-band as that of the RTS/CTS step (connection scheduling step).

Figure 6:
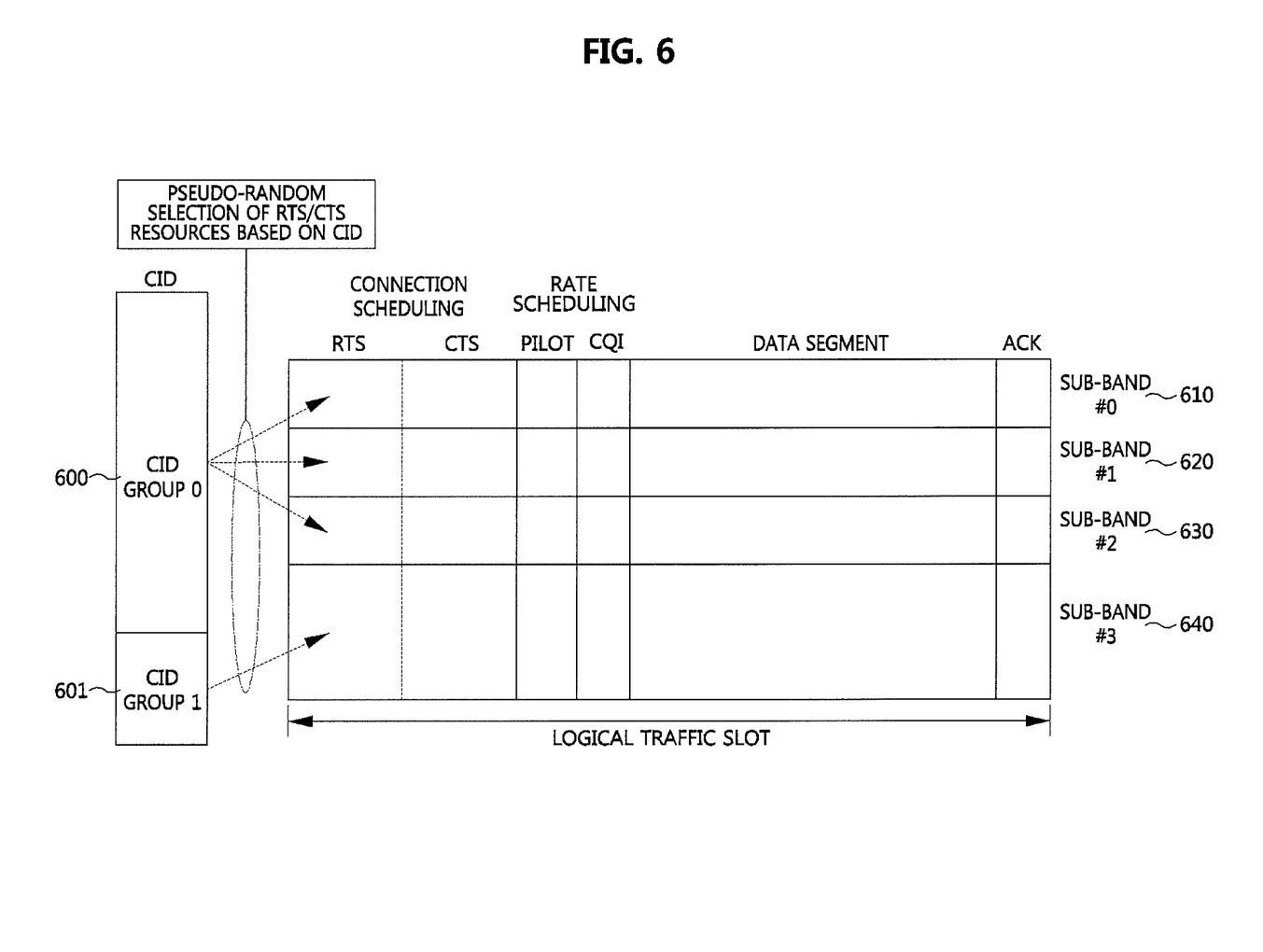
FIG. 6 is a conceptual diagram illustrating another example of management of sub-bands according to the present invention.

FIG. 6 is a conceptual diagram illustrating another example of management of sub-bands according to the present invention.

FIG. 6 illustrates that divided sub-bands have different bandwidths. That is, a sub-band(s) having a wider bandwidth may be prepared for a device/application requiring a wide bandwidth.

For instance, FIG. 6 illustrates that, for a first CID group 601, sub-band #3 640 is prepared, the sub-band #3 640 having a wider bandwidth than the bandwidths of the sub-band #0 610 to the sub-band #2 630 for the 0th CID group 600.

CIDs belonging to respective CID groups are configured to pseudo-randomly select resources for corresponding CID groups within sub-bands corresponding to respective groups. That is, the CIDs belonging to the 0th CID group may be mapped to resources of corresponding sub-bands 610 to 630 in the same manner as described above with reference to FIG. 5.

Configuration information for band division management, such as a bandwidth of each sub-band and the number of CIDs of each CID group, may be transmitted by a network (base station) to a device through signaling of system information (SI) or radio resource control (RRC) in the cases where distributed control D2D communication is supported within a cellular network.

Next, a priority guaranteeing method according to the present invention for guaranteeing a high priority of resource allocation for a device or application for which a high priority should be guaranteed, will be described.

Priority Guaranteeing Method According to the Present Invention

For a device/application which needs to transmit data as rapidly as possible or which is sensitive to transmission latency, a method for guaranteeing a high priority so that the device transmits data faster than other devices without prejudicing fairness, is needed.

This method may be described with respect to a case where data transmission between devices is performed by using the whole band in the traffic step, and with respect to a case where data transmission between devices is performed by dividing the whole band into a plurality of sub-bands.

1) A case where data transmission is performed by using the whole band in the traffic step In the case where data transmission between devices is performed by using the whole band in the traffic step, different CID groups may be operated for devices/applications having different priorities.

Figure 7:
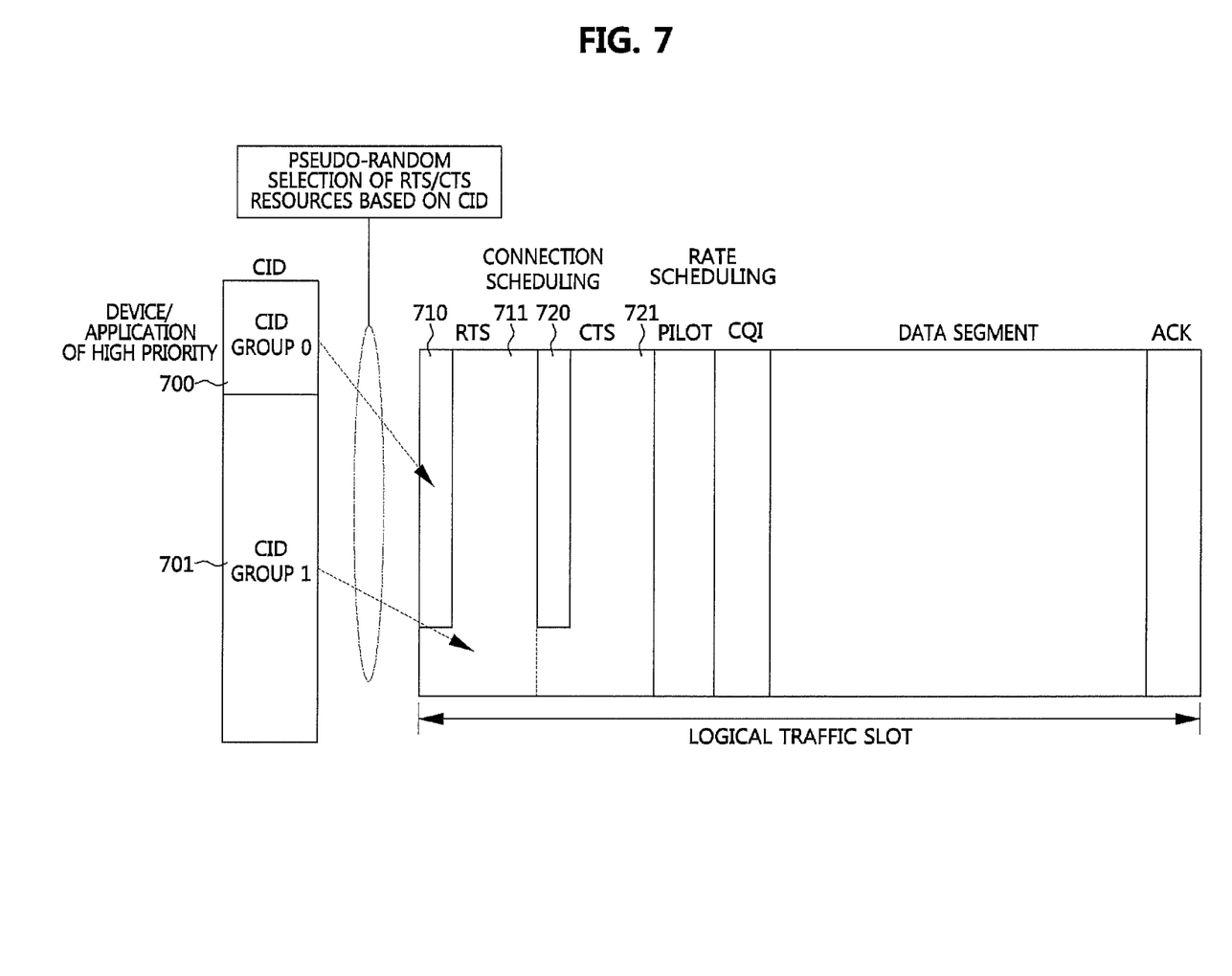
FIG. 7 is a conceptual diagram illustrating an example of a resource management method for guaranteeing a high priority in a traffic step.

FIG. 7 is a conceptual diagram illustrating an example of a resource management method for guaranteeing a high priority in the traffic step.

FIG. 7 illustrates that a 0th CID group 700 is allocated for a device/application requiring a high priority, and radio resources 710 and 720, which are dedicatedly allocated to a device/application having a high priority, are allocated for the CID group. Although FIG. 7 illustrates that only two CID groups 700 and 701 are operated, it would be obvious that more groups may be operated.

Expressions having different priorities in the paging step are configured to generate CIDs belonging to different CID groups. CIDs belonging to a CID group for devices having high priorities are configured to pseudo-randomly select resources belonging to a resource group having a high priority for connection scheduling (RTS/CTS).

2) A case where data transmission is performed by dividing the whole band into a plurality of sub-bands in the traffic step Secondly, in the case where data transmission is performed by dividing the whole band into a plurality of sub-bands in the traffic step, the above-described method for supporting a high-priority device/application for the case of using the whole band for data transmission may be applied to the case of managing a plurality of different sub-bands.

Figure 8:
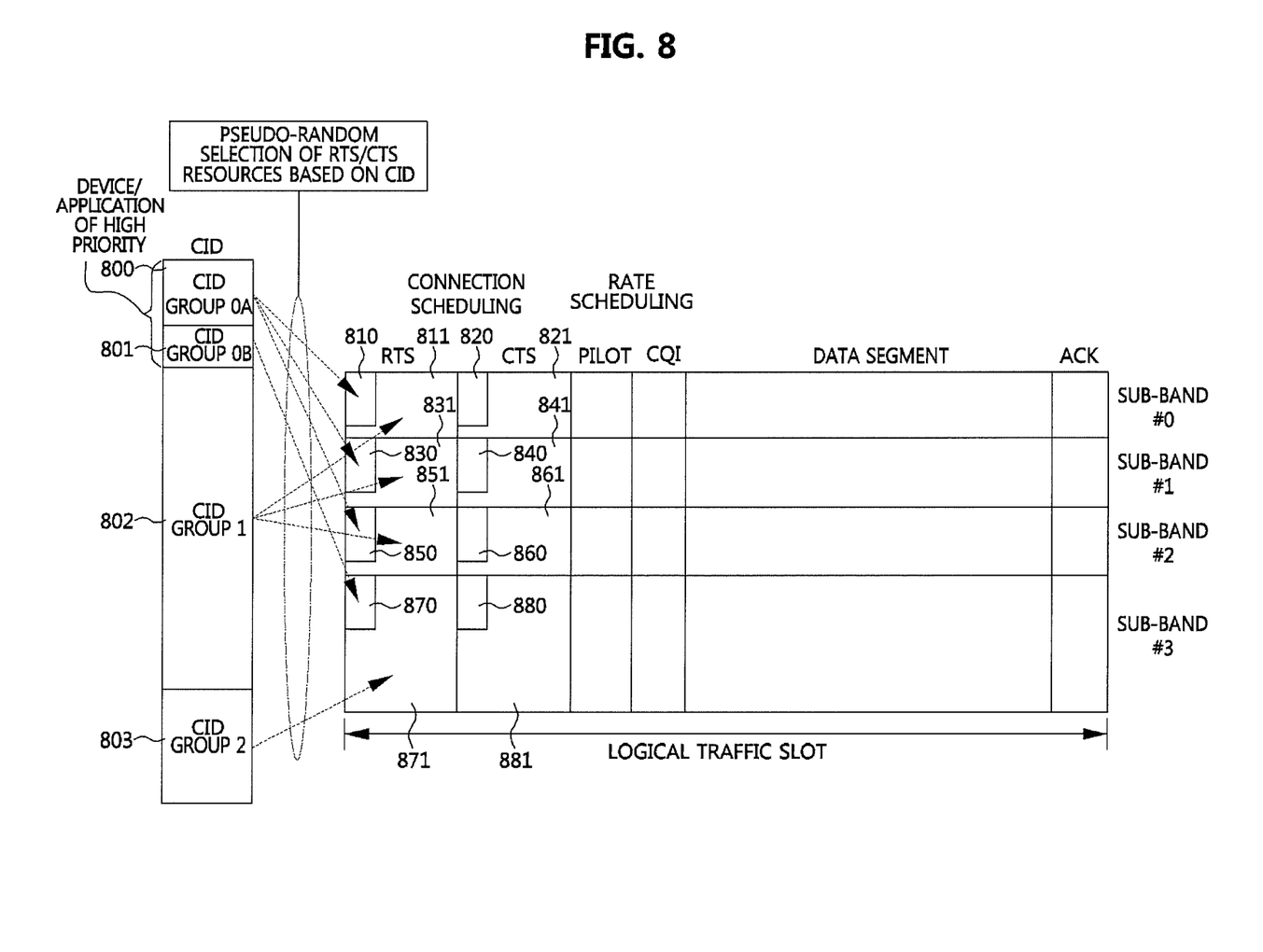
FIG. 8 is a conceptual diagram illustrating another example of a resource management method for guaranteeing a high priority in the traffic step.

FIG. 8 is a conceptual diagram illustrating another example of a resource management method for guaranteeing a high priority in the traffic step.

This method is basically the same as the method of managing a plurality of different sub-bands with respect to a device/application having an ordinary priority. FIG. 8 illustrates that a first CID group 802 and a second CID group 803 are allocated for a device/application having an ordinary priority.

Expressions having different priorities or different required bandwidths in the paging step are configured to generate CIDs belonging to different CID groups. For instance, an additional CID group (exemplarily illustrated as CID group 0a 800 in FIG. 8) for a device/application having a high priority may exist, and an additional CID group (CID group 0b 801 in FIG. 8) for a device/application having a high priority and requiring a wider bandwidth may exist.

Therefore, CIDs belonging to a CID group (e.g. CID group 0a) for devices having high priorities may be configured to pseudo-randomly select resource groups 810 to 860 having high priorities for the connection scheduling (RTS/CTS). CIDs belonging to an additional CID group (e.g. CID group 0b) for a device/application particularly requiring a high bandwidth may be configured to pseudo-randomly select resources belonging to resource groups 870 and 880 having high priorities from among resources of a sub-band with a wide bandwidth.

Configuration information for priority-differential support, such as the number of CIDs of each CID group, may be transmitted by a network (base station) to a device through signaling of system information (SI) or radio resource control (RRC) in the cases where distributed control D2D communication is supported within a cellular network.

According to the above-described resource management method according to the present invention, by dividing the whole frequency band into a plurality of sub-bands, a communication range can be extended, a low-power device can be accommodated, granularity of resources can be improved, and flexibility of resource management can be obtained.

Further, resources can be managed by appropriately considering the priority of a device or application, and also considering fairness between devices.

While the example embodiments of the present invention and their advantages have been described in detail, it should be understood that various changes, substitutions and alterations may be made herein without departing from the scope of the invention.

What is claimed is:

1. A method for managing resources for a traffic step of device-to-device communication, the method comprising:
    dividing, by a mobile device, a plurality of connection identifiers (CIDs) into N (N is a natural number) number of groups;
    dividing, by the mobile device, the resources for device-to-device communication into N number of sub-bands corresponding to the N number of groups; and
    allocating, by the mobile device, the resources by mapping CIDs respectively belonging to the N number of groups to the resources of the sub-bands respectively corresponding to the groups,
    wherein the traffic step includes, in sequence, pilot signal transmission, channel quality information (CQI) transmission, data transmission/reception, and ACK signal transmission,
    wherein, during the allocating of the resources, the allocated resources are for request to send (RTS) and clear to send (CTS) and the allocated resources are used for at least one of the pilot signal transmission, the channel quality information (CQI) transmission, the data transmission/reception, and the ACK signal transmission.

2. The method of claim 1, wherein, during the dividing of the resources, the N number of sub-bands have the same resource size.

3. The method of claim 1, wherein, during the dividing of the resources, sizes of resources of at least a part of the N number of sub-bands are different from sizes of resources of the other sub-bands.

4. The method of claim 1, wherein, during the dividing of the CIDs and the dividing of the resources, configuration information on the N number of groups and the N number of sub-bands is received from a network by using at least one of system information (SI) reception and radio resource control (RRC) signaling.

5. A method for managing resources for a traffic step of device-to-device communication, the method comprising:
    dividing, by a mobile device, a plurality of connection identifiers (CIDs) into N (N is a natural number) number of groups;
    assigning, by the mobile device, a dedicated resource for preferential access to at least one of the N number of groups; and
    allocating, by the mobile device, the dedicated resource for preferential access to CIDs belonging to the one group,
    wherein the traffic step includes, in sequence, pilot signal transmission, channel quality information (CQI) transmission, data transmission/reception, and ACK signal transmission,
    wherein, during the allocating of the dedicated resource for preferential access, the dedicated resource is for request to send (RTS) and clear to send (CTS) and the dedicated resource is used for at least one of the pilot signal transmission, the channel quality information (CQI) transmission, the data transmission/reception, and the ACK signal transmission.

6. The method of claim 5, wherein, during the assigning of the dedicated resource for preferential access, the resources for device-to-device communication are divided, for each of the N number of groups, into N number of sub-bands to which RTS/CTS resources are allocated, and, during the allocating of the dedicated resource for preferential access, the dedicated resource for preferential access is allocated in a sub-band corresponding to the at least one group.

7. The method of claim 6, wherein, during the assigning of the dedicated resource for preferential access, the N number of sub-bands have the same resource size.

8. The method of claim 6, wherein, during the assigning of the dedicated resource for preferential access, sizes of resources of at least a part of the N number of sub-bands are different from sizes of resources of the other sub-bands.

9. The method of claim 5, wherein, during the dividing of the CIDs and the assigning of the dedicated resource for preferential access, configuration information on the N number of groups and the dedicated resource for preferential access is received from a network by using at least one of system information (SI) reception and radio resource control (RRC) signaling.

* * * * *